United States Patent [19]

Kurasawa

[11] 4,075,646
[45] Feb. 21, 1978

[54] MULTI-EXPOSURE DEVICE FOR CAMERA

[75] Inventor: Makoto Kurasawa, Tokyo, Japan

[73] Assignee: Taiwan Ricoh Co., Ltd., China/Taiwan

[21] Appl. No.: 749,811

[22] Filed: Dec. 13, 1976

[30] Foreign Application Priority Data

Dec. 11, 1975 Japan .......................... 50-167636[U]

[51] Int. Cl.² ............................................. G03B 19/02
[52] U.S. Cl. ..................................... 354/209; 354/204
[58] Field of Search ............... 354/204, 209, 233, 251, 354/226, 202, 207

[56] References Cited

U.S. PATENT DOCUMENTS 2,304,887  12/1942  Crumrine .......................... 354/209 X
2,728,282  12/1955  Weiss ..................................... 354/204

Primary Examiner—John Gonzales
Attorney, Agent, or Firm—McGlew and Tuttle

[57] ABSTRACT

A multi-exposure device for a camera of the self-cocking type includes a shutter which is charged by operating a shutter charging member in interlocked relationship with a film winding operation. The device permits a shutter charging by an external operation of the shutter charging member alone independently from the film winding operation, thus achieving permitting a multiple exposure of a single frame of a film loaded on the camera.

8 Claims, 2 Drawing Figures

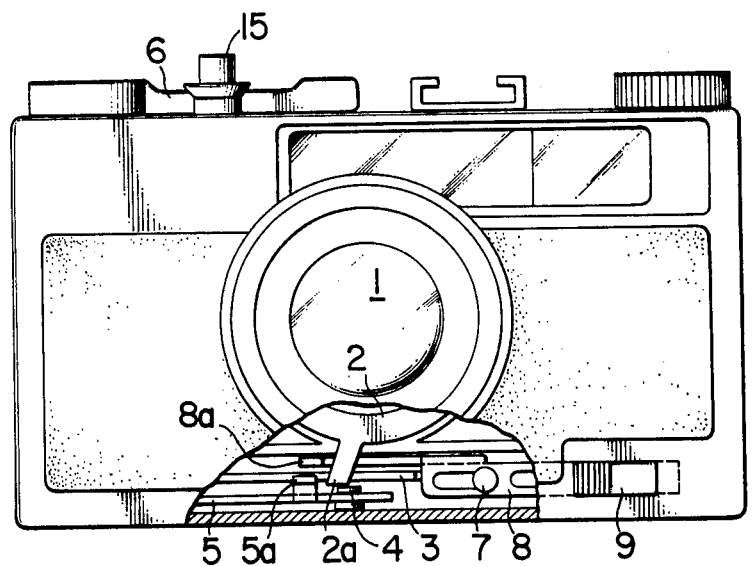
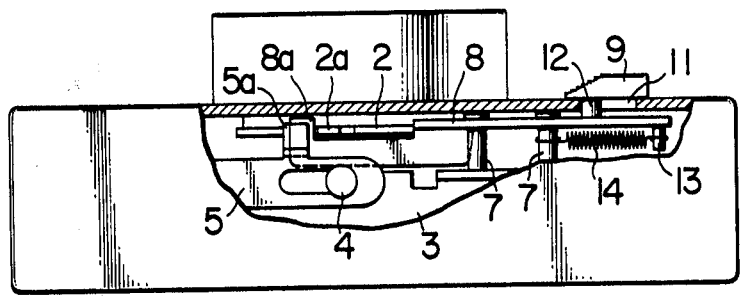

MULTI-EXPOSURE DEVICE FOR CAMERA

BACKGROUND OF THE INVENTION

The invention relates to a multi-exposure device for a camera, and more specifically, to a device for allowing a double exposure or more to be applied to one frame of a film which is loaded in a camera of a self-cocking type in which a shutter charging takes place in conjunction with a film winding operation.

A multi-exposure device for camera is already known which permits a single frame of film loaded in a camera to be subjected to a multiple exposure. A conventional multi-exposure device, in particular, for a camera a self-cocking type in which a shutter charging takes place in interlocked relationship with a film winding operation includes a multi-exposure switching member externally mounted on the camera and which be operated to accomplish a shutter charging without accompanying a film winding operation when a film winding lever is operated. To provide a shutter charging in response to an operation of the film winding lever, a clutch has been interposed between the film winding lever and a film winding shaft, for example, a sprocket shaft, in a camera which employs a perforated film, so that the operative connection between the film winding lever and the sprocket shaft can be interrupted when the multi-exposure switching member is operated. From the standpoint of operating procedure, this requires an initial switching operation, followed by a shutter charging by the film winding lever before a multi-exposure can be effected. In an arrangement in which the multi-exposure switching member is not automatically reset after each multi-exposure, it must be manually reset in order to enable a normal exposure. On the other hand, as considered from the standpoint of construction, the conventional device incorporates a clutch interposed between the film winding member in the form of a lever, for example, and the film winding shaft, which results in a complex mechanism. In addition, an added adjustment of the mechanism is required during assembly in order to assure a proper functioning of the clutch. Finally, a resetting mechanism must be separately provided to return the camera to a normal exposure in order to avoid failures.

SUMMARY OF THE INVENTION

It is an object of the invention to provide a multi-exposure device which is substantially simpler in construction than conventional ones and which achieves the intended function in one step.

It is a feature of the invention that a shutter charging member is provided separately from a self-cocking member which is usually provided to achieve a shutter charging in interlocked relationship with a film winding operation, and is operable independently from the self-cocking member. During a multi-exposure, the shutter can be charged by the charging member independently from the film winding member. A single step operation of the charging member conditions a camera for a multi-exposure, and the switching construction is greatly simplified. It is to be noted that the invention is applicable to any camera of a self-cocking type, including cameras having either a bladed shutter or a focal place shutter.

BRIEF DESCRIPTION OF THE DRAWINGS

FIG. 1 is a front view, partially broken away, of one embodiment of the invention; and
FIG. 2 is a bottom view, partially broken away, of the embodiment.

DESCRIPTION OF THE PREFERRED EMBODIMENT

Rotatably disposed about the optical axis of an exposure lens 1 is a shutter charging member 2, which is urged by a spring, not shown, to rotate clockwise as viewed in FIG. 1. Normally the charging membr 2 assumes a position shown in FIG. 1 and functions to charge a shutter by rotating counterclockwise to the bottom of the camera, and a self-cocking member 5 is slidably supported on the base plate 3 by means of a headed bolt 4. The self-cocking member 5 is interconnected with a film winding lever 6 so that it moves through one reciprocatory stroke in response to a single actuation of the film winding lever 6, as is well known in the art. An ear 5a extends from a lateral edge of the self-cocking member 5 toward the front of the camera, and is located adjacent to an arm 2a projecting radially outward from the shutter charging member 2. As the self-cocking member 5 reciprocates when the film winding lever 6 is operated, the shutter charging member 2 is driven by the ear in the counterclockwise direction, as viewed in FIG. 1, thus charging the shutter.

An operating member 8 is slidably supported on a front plate of the camera by means or a headed bolt 7, and has its one end 8a located adjacent to the arm 2a of the charging member 2 in a similar manner as the ear 5a. A multi-exposure operating member 9 is mounted on the front surface of the camera and is fixedly mounted on a pin 12 which is fixedly mounted on the operating member 8 and which extends through an elongate slot 11 formed in the front plate of the camera. A tension spring 14 is disposed between a pin 13 on the right-hand end of the operating member 8 and the bolt 7 and tends to pull the operating member 8 to the left.

When it is desired to effect a multi-exposure, the operating member 9 is moved to the right, as viewed in the drawing, against the resilience of the spring 14. The end 8a engages and moves the arm 2a of the charging member 2, so that the shutter is charged. The charging of the shutter by the operating member 9 takes place independently from the film winding lever and the self-cocking member 5.

When the operating member 9, which has been moved to the right in order to charge the shutter, is released, the operating member 8 is moved to the position shown under the forces of the spring 14. The spring 14 may be eliminated, and still the operating member 9 will return under due to the bias applied to the charging member 2. Subsequently, or after a single motion of the operating member 9, a shutter button 15 may be depressed to effect a multi-exposure, in the usual manner as in a normal photographing operation.

What is claimed is:
1. A multi-exposure device for camera comprising a receiprocable shutter charging member, a self-cocking member for driving the shutter charging member to charge a shutter in interlocked member for driving the charging member independently from the self-cocking member, and means interconnected with the operating member and adapted to be operated externally of a camera.

2. A multi-exposure device according to claim 1 in which the shutter charging member is disposed rotatably about the optical axis of a taking lens.

3. A multi-exposure device according to claim 1 in which the self-cocking member and the operating member are disposed in the bottom portion of the camera.

4. In a camera comprising an exposure opening, a shutter for opening and closing the opening including a rotatable shutter member having an arm portion and being rotatable between a closed cocked position to an opened position, shutter operating means connected to said shutter for releasing said shutter from a cocked position to expose the film, a winding lever for advancing the film, and a self-cocking member connected to said winding lever and movable therewith to engage the arm portion of the shutter and move it to a cocked position during a winding stroke of the winding lever, the improvement comprising, a multi-exposure operating member mounted for movement in said camera and being engageable with said shutter are portion independently of said self-cocking member to move said shutter to a cocked position.

5. In a camera according to claim 4, wherein said self-cocking member has an actuating portion adjacent said shutter arm portion movable with said self-cocking member in a direction toward said shutter arm portion to rotate said shutter, said multi-exposure operating member having a portion disposed on the opposite side of said shutter arm portion from said self-cocking member and an actuating portion engaged around said shutter arm portion at the opposite side thereof and being movable with said multi-exposure operating member to engage said actuating portion of said multi-exposure operating member with said shutter arm portion to rotate said shutter.

6. In a camera according to claim 4, including spring means biasing said multi-exposure operating member in a direction away from engagement with said arm portion and stop means limiting the movement of said multi-exposure operating member by said spring means.

7. In a camera according to claim 4, wherein said camera has a housing with a slot therein, said multi-exposure operating member having a hand-operated portion extending through said slot which may be displaceable by hand to move said shutter to a cocked position.

8. In a camera according to claim 7, including spring means biasing said multi-exposure operating member in a direction to urge said operating portion against the end of said slot in a non-actuated position.

* * * * *